US010313353B2

(12) United States Patent
Lu (10) Patent No.: US 10,313,353 B2
(45) Date of Patent: Jun. 4, 2019

(54) METHOD, DEVICE, TERMINAL, AND SERVER FOR VERIFYING SECURITY OF SERVICE OPERATION (71) Applicant: ALIBABA GROUP HOLDING LIMITED, George Town, Grand Cayman (KY)

(72) Inventor: Kun Lu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 17 days.

(21) Appl. No.: 14/880,637

(22) Filed: Oct. 12, 2015

(65) Prior Publication Data

US 2016/0103997 A1 Apr. 14, 2016

(30) Foreign Application Priority Data

Oct. 13, 2014 (CN) .......................... 2014 1 0539483

(51) Int. Cl.
*H04L 29/06* (2006.01)
*G06F 21/57* (2013.01)
(Continued)

(52) U.S. Cl.
CPC .......... *H04L 63/102* (2013.01); *G06F 21/316* (2013.01); *G06F 21/577* (2013.01);
(Continued)

(58) Field of Classification Search
CPC ................. G06F 21/316; G06F 21/577; G06F 2221/034; H04L 63/102; H04L 67/30; H04L 67/303; H04L 67/306
See application file for complete search history.

(56) References Cited

U.S. PATENT DOCUMENTS 7,614,078 B1 * 11/2009 Stieglitz .................. H04L 9/321
380/247
8,635,117 B1 1/2014 Acuna-Rohter
(Continued)

FOREIGN PATENT DOCUMENTS

CN 103875003 A 6/2014
EP 2 733 635 A2 5/2014
(Continued)

OTHER PUBLICATIONS

PCT International Search Report and Written Opinion dated Mar. 4, 2016, issued in corresponding International Application No. PCT/US15/55120 (11 pages).
(Continued)

*Primary Examiner* — Theodore C Parsons
(74) *Attorney, Agent, or Firm* — Finnegan, Henderson, Farabow, Garrett & Dunner, LLP (57) ABSTRACT A method for verifying a security of a service operation is provided. The method includes receiving, by a service terminal, a creditability analysis instruction of the service operation, where the creditability analysis instruction is sent by a service server. The method may further include obtaining, by the service terminal, a creditability analysis result of the service operation based on the creditability analysis instruction and one or more risk control models pre-stored in the service terminal, and sending the creditability analysis result to the service server for determining the security of the service operation.

26 Claims, 8 Drawing Sheets

(51) Int. Cl.
  *H04L 29/08* (2006.01)
  *G06F 21/31* (2013.01)
  *G06Q 20/40* (2012.01)
  *H04L 9/32* (2006.01)
  *G06Q 30/06* (2012.01)
  *G06Q 20/20* (2012.01)
  *G06Q 50/00* (2012.01)

(52) U.S. Cl.
  CPC ..... *G06Q 20/4014* (2013.01); *G06Q 20/4016* (2013.01); *G06Q 30/0609* (2013.01); *H04L 9/32* (2013.01); *H04L 63/08* (2013.01); *H04L 67/30* (2013.01); *H04L 67/303* (2013.01); *G06F 2221/034* (2013.01); *G06Q 20/20* (2013.01); *G06Q 50/01* (2013.01); *H04L 67/22* (2013.01); *H04L 67/306* (2013.01)

(56) References Cited

U.S. PATENT DOCUMENTS

| | | | |
|---|---|---|---|
| 8,635,662 | B2 | 1/2014 | Lang |
| 8,856,894 | B1 | 10/2014 | Dean et al. |
| 9,654,477 | B1* | 5/2017 | Kotamraju ............ H04L 63/102 |
| 2009/0199264 | A1 | 8/2009 | Lang |
| 2013/0097659 | A1 | 4/2013 | Das et al. |
| 2013/0167196 | A1* | 6/2013 | Spencer ................ H04W 8/22 726/3 |
| 2014/0053261 | A1* | 2/2014 | Gupta .................... G06F 21/55 726/22 |
| 2014/0137191 | A1* | 5/2014 | Goldsmith ............ H04L 63/08 726/3 |
| 2014/0208424 | A1* | 7/2014 | Hudack ................ G06F 21/316 726/23 |
| 2014/0337930 | A1* | 11/2014 | Hoyos .................... H04L 63/10 726/4 |
| 2016/0057248 | A1* | 2/2016 | Tankha ................ H04L 67/306 726/6 |
| 2016/0239649 | A1* | 8/2016 | Zhao ..................... G06F 21/316 |
| 2017/0006009 | A1* | 1/2017 | Hessler ................. G06F 21/10 |

FOREIGN PATENT DOCUMENTS

| | | |
|---|---|---|
| EP | 2 733 635 A3 | 11/2017 |
| WO | WO 2014/145395 A2 | 9/2014 |
| WO | WO 2014/145395 A3 | 9/2014 |

OTHER PUBLICATIONS

Extended European Search Report in European Application No. 15866753.5-1870, pursuant to Rule 62 EPC, the supplementary European search report (Art. 153(7) EPC) and the European Search Opinion dated Aug. 31, 2017.
First Chinese Search Report issued by the State Intellectual Property Office of the People's Republic of China in counterpart Chinese Application No. 2014105394832 dated Jan. 8, 2018 (2 pages).
First Chinese Office Action issued by the State Intellectual Property Office of the People's Republic of China in counterpart Chinese Application No. 2014105394832 dated Jan. 17, 2018 (14 pages).
Second Chinese Office Action issued by the State Intellectual Property Office of the People's Republic of China in counterpart Chinese Application No. 2014105394832 dated Jul. 16, 2018 (10 pages).
Communication Pursuant to Article 94(3) EPC issued by the European Patent Office for European Application No. 15866753.5 dated Apr. 1, 2019 (4 pages).

* cited by examiner

METHOD, DEVICE, TERMINAL, AND SERVER FOR VERIFYING SECURITY OF SERVICE OPERATION

CROSS-REFERENCE TO RELATED APPLICATION

This application is based upon and claims priority to Chinese Patent Application No. 201410539483.2, filed Oct. 13, 2014, the entire contents of which are incorporated herein by reference.

TECHNICAL FIELD

The present application relates to the technical field of communications and, more particularly, to a method, device, terminal, and server for verifying a security of a service operation.

BACKGROUND

With the development of smart terminals and popularization of network applications, a user may conduct various service operations using various application clients installed on a terminal, such as instant messaging services, payment services, and the like. To use the above services, a user of a terminal often needs to register a service account on a server, and perform a certain service operation based on this service account.

Conventionally, a user's network behavior pattern may be obtained based on data mining technologies. For example, when a service operation is performed in connection with the service account, a service server may verify the service security according to the user's network behavior pattern to prevent service risks. However, mining of the user's network behavior pattern is generally limited to the historical service data of the user, historical browsing data of the user, and the like, where data contents are relatively alike, thereby resulting in inaccurate verification of the security of the service operation.

SUMMARY

The present disclosure provides a method for verifying a security of a service operation. Consistent with some embodiments, the method includes receiving, by a service terminal, a creditability analysis instruction of the service operation, the creditability analysis instruction being sent by a service server. The method may further include obtaining, by the service terminal, a creditability analysis result of the service operation based on the creditability analysis instruction and one or more risk control models pre-stored in the service terminal, and sending, by the service terminal, the creditability analysis result to the service server for determining the security of the service operation.

Consistent with some embodiments, this disclosure provides another method for verifying a security of a service operation. The method includes sending a creditability analysis instruction of the service operation to a service terminal and receiving a creditability analysis result sent by the service terminal. The creditability analysis result may be obtained by the service terminal based on the creditability analysis instruction of the service operation and one or more risk control models pre-stored in the service terminal. The method may further include determining the security of the service operation based on the creditability analysis result.

Consistent with some embodiments, this disclosure provides a device for verifying a security of a service operation. The device includes a receiving unit configured to receive a creditability analysis instruction of the service operation sent by a service server, an analyzing unit configured to obtain a creditability analysis result of the service operation based on the creditability analysis instruction and one or more risk control models pre-stored in a service terminal, and a sending unit configured to send the creditability analysis result to the service server for determining the security of the service operation.

Consistent with some embodiments, this disclosure provides another device for verifying a security of a service operation. The device includes a sending unit configured to send a creditability analysis instruction of the service operation to a service terminal and a receiving unit configured to receive a creditability analysis result sent by the service terminal. The creditability analysis result may be obtained by the service terminal based on the creditability analysis instruction of the service operation and one or more risk control models pre-stored in the service terminal. The device may further include a verifying unit configured to determine the security of the service operation based on the creditability analysis result.

Consistent with some embodiments, this disclosure provides a terminal. The terminal includes a processor and a memory configured to store instructions executable by the processor. The processor may be configured to receive a creditability analysis instruction of a service operation sent by a service server, obtain a creditability analysis result of the service operation based on the creditability analysis instruction and one or more risk control models pre-stored in the terminal, and send the creditability analysis result to the service server for determining a security of the service operation.

Consistent with some embodiments, this disclosure provides a service server. The service server includes a processor and a memory configured to store instructions executable by the processor. The processor may be configured to send a creditability analysis instruction of a service operation to a service terminal and receive a creditability analysis result sent by the service terminal. The creditability analysis result may be obtained by the service terminal based on the creditability analysis instruction of the service operation and one or more risk control models pre-stored in the service terminal. The processor may be further configured to determine a security of the service operation based on the creditability analysis result.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
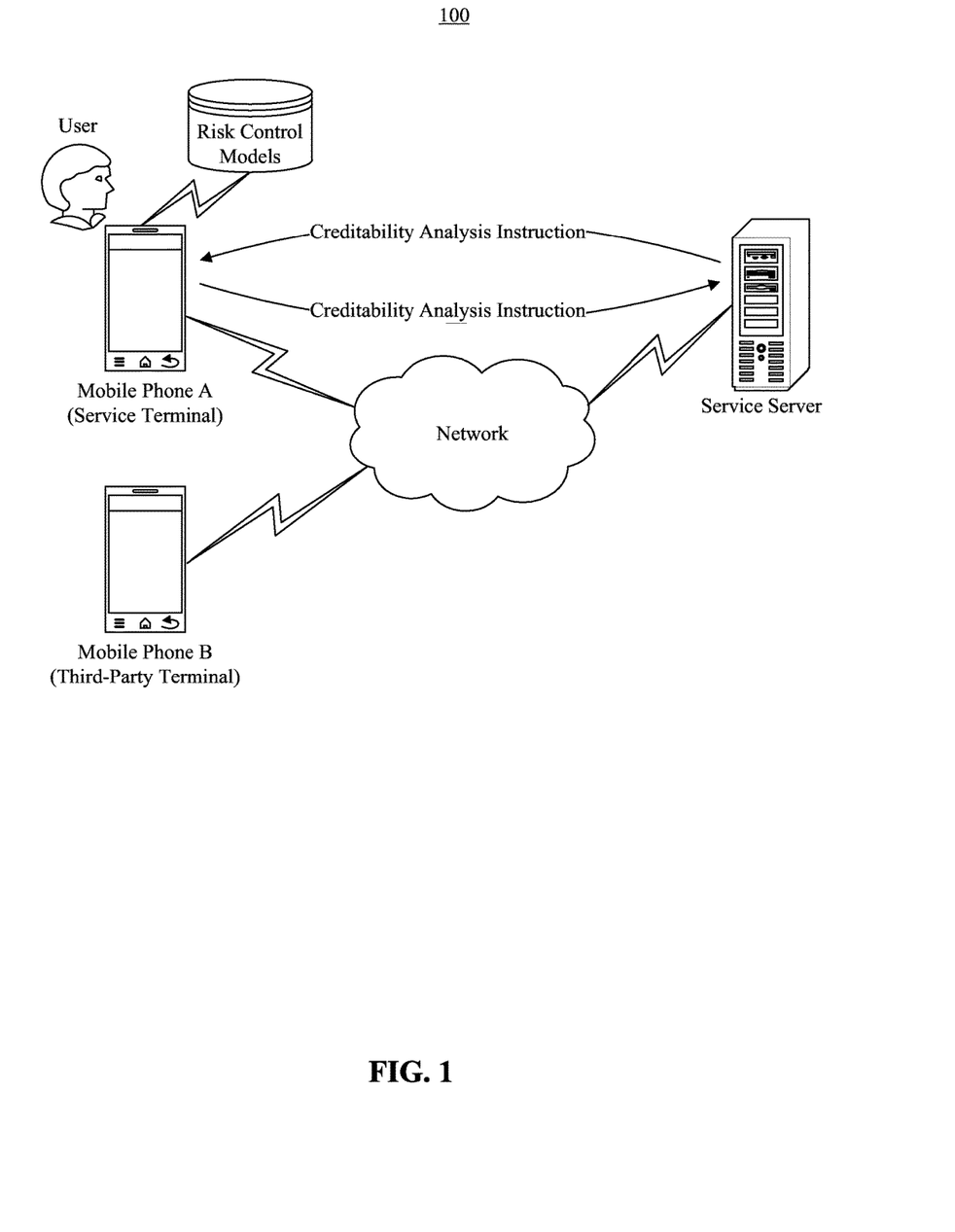
FIG. 1 illustrates an exemplary system environment for implementing methods and devices consistent with the present disclosure.

FIG. 1 illustrates an exemplary system environment 100 for implementing methods and devices consistent with the present disclosure. As shown in FIG. 1, the system environment 100 includes a service server and mobile phones of a user who has registered a service account on the service server. The mobile phones shown in FIG. 1 include a mobile phone "A" serving as a service terminal and a mobile phone "B" serving as a third-party terminal.

In some embodiments, mobile phone A is locally provided with a security control database, which includes a plurality of risk control models established according to user data in the mobile phone A. After the service server receives a service operation request, a creditability analysis instruction of the service operation may be sent to the mobile phone A. The mobile phone A may then obtain a creditability analysis result by calling the risk control models and return the creditability analysis result to the service server. The service server may determine the security of the service operation according to the creditability analysis result. Since the user data includes private data of the user stored in the mobile phone, the user data may reflect a social relationship, a daily routine, and the like of the user. Thus, by verifying the creditability of the service operation of the user using the risk control models, the accuracy for verifying the security of the service operation may be improved.

Figure 2:
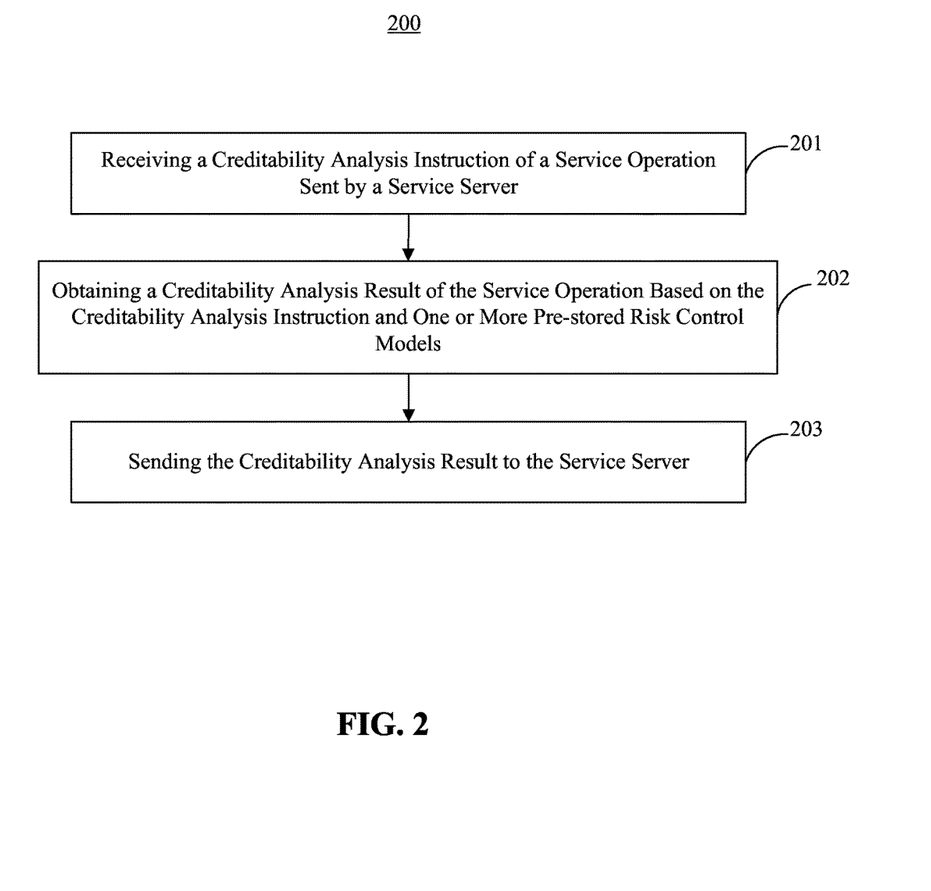
FIG. 2 is a flowchart of an exemplary method for verifying the security of a service operation, consistent with some embodiments of this disclosure.

FIG. 2 is a flowchart of an exemplary method 200 for verifying the security of a service operation, consistent with some embodiments of this disclosure. The exemplary method 200 may be performed by a service terminal, such as a smart phone, a tablet, a Personal Computer (PC), or the like. Referring to FIG. 2, the method 200 includes the following steps.

In step 201, the service terminal receives a creditability analysis instruction of a service operation sent by a service server. For example, a user of a service terminal may register a service account on the service server in advance so that the user may complete various service operations based on the service server after logging into the service server according to the service account. In some implementations, the service server may be a server maintained by a third party for supporting implementations of a specific service, such as a third-party payment system server for facilitating goods purchasing transactions.

In some embodiments, the user of the service terminal may send an operation request of a service operation to the service server via the service terminal. For example, the user may perform a transfer operation via the service terminal, and the service terminal may send an operation request of this transfer operation to the service server. In other embodiments, another terminal, such as a third-party terminal, may send an operation request of the service operation to the service server with respect to user of the service terminal. For example, the user of the other terminal may send an operation request to the service server after purchasing some goods, requesting the user of the service terminal to perform a payment operation. The service server may send a creditability analysis instruction of this service operation to the service terminal after receiving the operation request of the service operation from the other terminal.

In step 202, the service terminal obtains a creditability analysis result of the service operation based on the creditability analysis instruction and one or more pre-stored risk control models. For example, the service terminal may call the pre-stored risk control models to obtain the creditability analysis result when receiving the creditability analysis instruction from the service server. In some embodiments, after obtaining an authorization permission of the user, the service terminal may obtain user data from the service terminal based on the authorization permission. The user data may comprise the user's social data, interest data, habit data, and the like. The service terminal may generate a plurality of risk control models by analyzing the above user data, where each risk control model may contain a corresponding relationship between service information and service creditability analysis values. For example, the risk control models may include a social relationship control model generated according to the user social data, an interest control model generated according to the interest data, a habit control model generated according to the habit data, and the like. The service terminal may then store these risk control models in a local security control database after encrypting the risk control models.

In some embodiments, the service terminal may obtain service information of the service operation according to the creditability analysis instruction. For example, where the service terminal sends an operation request to the service server, the service terminal may obtain service information of the service operation according to the operation request sent by the service terminal when receiving the creditability analysis instruction. The service information may comprise information of the service recipient, type of the service operation, content of service operation, and the like. For example, when the service operation is a transfer operation, the information of the service recipient may include a name of a party of the transfer operation, the type of the service operation may be a transfer transaction, and the content information of the service operation may include a transfer amount.

Where another terminal sends an operation request to the service server, the service server may obtain service information from this operation request, include this service information in the creditability analysis instruction, and send the service information to the service terminal, such that the service terminal may obtain the service information from the creditability analysis instruction. The service information may comprise information of the service recipient, type of the service operation, content of service operation, and the like. For example, when the service operation is a payment operation, the information of the service recipient may include a name of an initiator of the payment transaction, the type of the service operation may be a payment transaction, and the content information of the service operation may include a payment amount.

After obtaining the service information of the service operation, the service terminal may call a target risk control model from pre-stored risk control models based on the type of the service operation. For example, the service terminal may search the target risk control model by using the service information as a keyword to obtain a service creditability analysis value as a creditability analysis result.

In step 203, the service terminal sends the creditability analysis result to the service server. The service server may determine the security of the service operation according to the creditability analysis result.

In the method 200, when verifying the security of the service operation, the creditability analysis result of the service operation may be obtained by using the risk control models of the service terminal. Since the risk control models may be generated according to user data stored in the service terminal, which may reflect a social relationship, a habit and the like of the user, the accuracy for verifying the security of the service operation may be improved.

Figure 3:
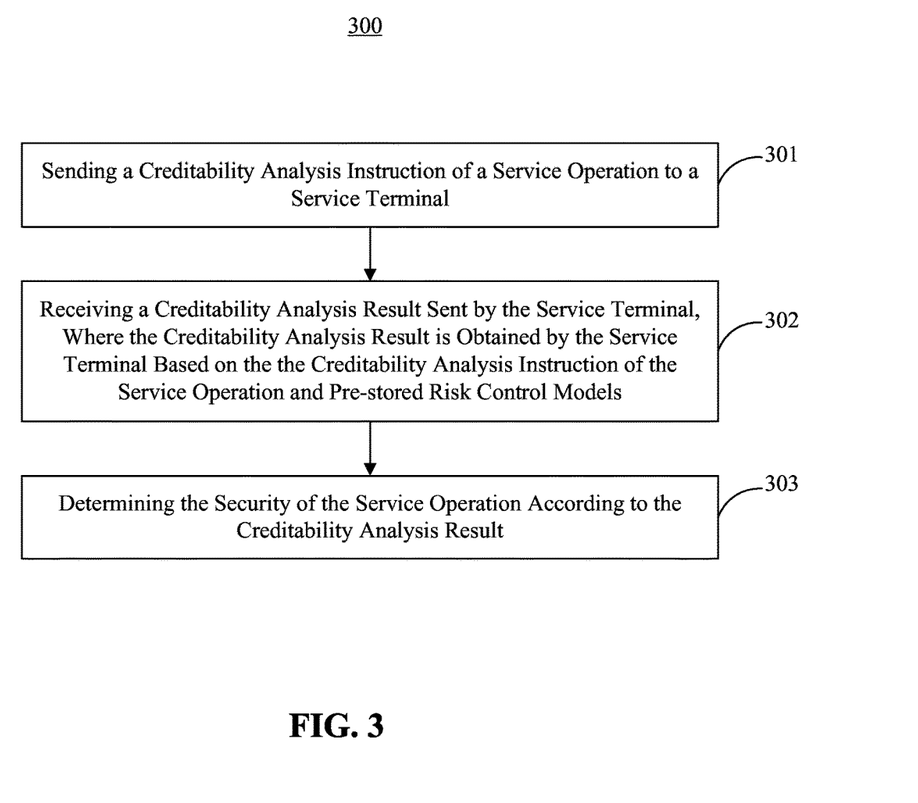
FIG. 3 is a flowchart of another exemplary method for verifying the security of a service operation, consistent with some embodiments of this disclosure.

FIG. 3 is a flowchart of another exemplary method 300 for verifying the security of a service operation, consistent with some embodiments of this disclosure. The exemplary method 300 may be performed by a service server. Referring to FIG. 3, the method 300 includes the following steps.

In step 301, the service server sends a creditability analysis instruction of the service operation to a service terminal. The process of sending the creditability analysis instruction to a service terminal may be implemented in a manner consistent with the description of the method 200 in connection with FIG. 2, which will be omitted herein.

In step 302, the service server receives a creditability analysis result sent by the service terminal, where the creditability analysis result is obtained by the service terminal based on the creditability analysis instruction of the service operation and one or more risk control models pre-stored in the service terminal. The process of receiving the creditability analysis result by the service server may be implemented in a manner consistent with the description of the method 200 in connection with FIG. 2, which will be omitted herein.

In step 303, the service server determines the security of the service operation according to the creditability analysis result.

In some embodiments, a local risk control model may be stored in the service server, and the local risk control model may be created according to network behavior data of the terminal user. When the security of the service operation is verified, the service server may obtain a first creditability analysis value of the service operation according to the local risk control model, and use the creditability analysis result sent by the service terminal as a second creditability analysis value. The service server may obtain weight values for the first creditability analysis value and the second creditability analysis value respectively, multiply the first creditability analysis value and the second creditability analysis value by respective weight values, and summate the weighted first creditability analysis value and the weighted second creditability analysis value to obtain a combined creditability analysis value. The service server may then compare the combined creditability analysis value with a preset creditability threshold. The service server may determine that the service operation is secure if the combined creditability analysis value is greater than the creditability threshold and determine that the service operation is insecure if the combined creditability analysis value is not greater than the creditability threshold.

In the method 300, when the security of the service operation is verified, the creditability analysis result of the service operation may be obtained by using the risk control models inside the service terminal. Since the risk control models may be generated according to user data stored in the service terminal, which may reflect a social relationship, a habit and the like of the user, the accuracy for verifying the security of the service operation may be improved.

Figure 4:
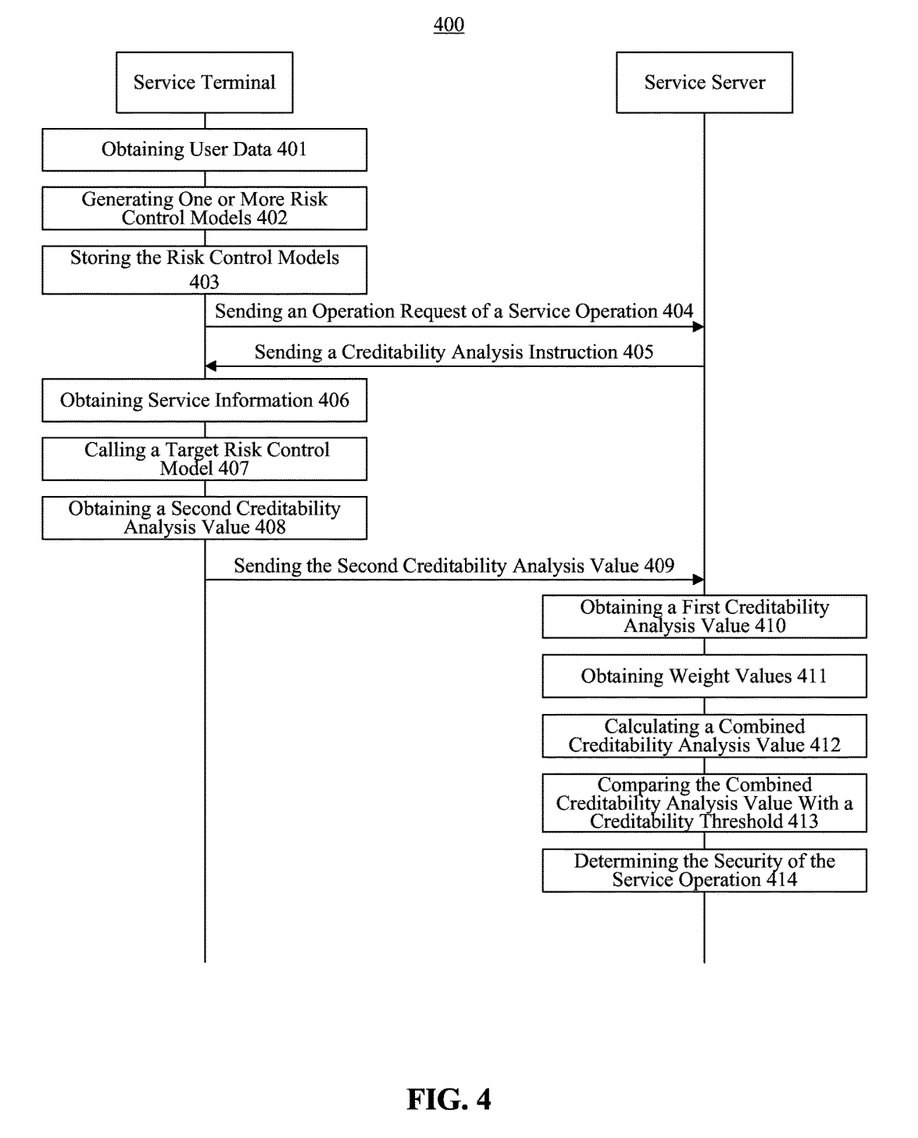
FIG. 4 is a flow diagram of an exemplary method for verifying the security of a service operation, consistent with some embodiments of this disclosure.

FIG. 4 is a flow diagram of an exemplary method for verifying the security of a service operation, consistent with some embodiments of this disclosure. The exemplary method 400 may be implemented between a service terminal and a service server for verifying the security of a service operation. Referring to FIG. 4, the method 400 includes the following steps.

In step 401, the service terminal obtains user data from the service terminal according to an authorization permission of a user of the service terminal. The user data in the service terminal may include private information of the user.

In some implementations, the authorization permission of the user may be obtained in advance. For example, an Application ("APP") may be installed in the service terminal to obtain the user data. The user may grant the authorization permission by installing this APP, and as a result, the user data may be accessed by the service terminal.

The user data may comprise user social data, interest data, habit data, or the like. For example, the user social data may include conventional communication information in the service terminal, such as groups, contacts, and notes in an address book, participants of past calls, call duration, and number-of-call information in call records, sender and recipient of past text messages and text message quantity in text message records, and the like. The user data may further comprise communication information associated with an instant messaging application installed in the service terminal, such as contacts of instant messaging, connection duration of each contact, and the like. The interest data may comprise browsing history of the user obtained by a browser in the service terminal, such as goods, events searched by a user, or the like. The interest data may further comprise geographical location information of the user obtained by a positioning device in the service terminal, such as restaurants, shopping malls where the user frequently visits, and the like. The habit data may comprise information recorded by a notebook in the service terminal, such as user itineraries, reminders, and the like. The habit data may further comprise settings of applications in the service terminal, such as alarm setting, calendar reminders and the like. The user of the service terminal may authorize the service terminal to obtain a part or all of the above described user data without departing from the scope of the present disclosure.

In step 402, the service terminal generates one or more risk control models by analyzing the user data. After obtaining the user data in the step 401, different types of user data may be analyzed so that a social relationship control model, an interest control model, and/or a habit control model may be obtained, where each risk control model includes a corresponding relationship between service information and service creditability analysis values.

The social relationship control model may be generated based on the user social data and may include a corresponding relationship between contacts of the user and creditability analysis values of these contacts. For example, if contact member "A" is a relative of the terminal user, contact member A may obtain a high creditability analysis value. As another example, if the time period that contact member "B" has been added in a user address book is long and the frequency of contact member B communicating with the user is high, contact member B may be a colleague or friend of the user and, thus, may obtain a high creditability analysis value. As another example, if the time period that contact member "C" has been added in the user address book is short and contact member C only interacts with the user with few text messages, contact member C may be a stranger and, thus, may obtain a low creditability analysis value.

The interest control model may be generated according to the interest data and may indicate a corresponding relationship between objects of interest of the user and creditability analysis values of the objects of interest. For example, if the object of interest of the user is a laptop and a browsing history of the user indicates that the user frequently browses relevant information of the laptop within a certain period of time, a high creditability analysis value may be set for the laptop. As another example, if the object of interest of the user is a shopping mall but geographical location information indicates that the user rarely visits this shopping mall, a low creditability analysis value may be set for this shopping mall.

The habit control model may be generated according to the habit data and may indicate a corresponding relationship between usual activities of the user and creditability analysis values of the usual activities. For example, the usual activity of the user is to run for one hour in a park at 8 PM every night, a high creditability analysis value may be set for running in the park from 8 PM to 9 PM every night.

In some embodiments, the service information may be excluded from the above risk control models, and a creditability analysis value corresponding to the service information may be set as zero by default.

In step 403, the service terminal stores the risk control models in a local security control database of the service terminal.

In some embodiments, the risk control models obtained in the step 402 may be encrypted in order to ensure the security of the risk control models in the service terminal, and the encrypted risk control models may be stored in the local security control database. When the risk control models are used by the service terminal, the encrypted risk control models may be decrypted by performing a decryption algorithm corresponding to the encryption algorithm.

In step 404, when the user of the service terminal initiates a service operation, the service terminal sends an operation request of the service operation to the service server. For example, the user may register a service account on the service server in advance, such that various service operations may be completed when the terminal user logs in the service server according to the service account. When the user initiates a certain service operation, the service terminal may send an operation request of the service operation to the service server. The operation request may contain information of the service recipient, type of the service operation, content of service operation, and the like. For example, when the service operation is that the user transfers RMB 10,000 to a friend, the information of the service recipient may comprise a user name, a name, a mobile phone number, an email address and the like of the friend, the type of the service operation may be a transfer transaction, and the content information of the service operation may include a transfer amount of RMB 10,000.

In step 405, the service server sends the creditability analysis instruction of the service operation to the service terminal according to the operation request. For example, after receiving the operation request of the service operation, the service server may request the service terminal to analyze the creditability of the service operation by sending the creditability analysis instruction of the service operation to the service terminal.

In step 406, the service terminal obtains service information of the service operation according to the operation request previously sent in step 404. As described above in step 404, the operation request of the service operation may contain information of the service recipient, type of the service operation, content of service operation, and the like. The service terminal may use the above described information as the service information of the service operation.

In step 407, the service terminal calls a target risk control model from the risk control models according to the type of the service operation. Since the risk control models are stored in the local security control database of the service terminal and each risk control model may correspond to a different type of service operation, the service terminal may call the target risk control model corresponding to the type of the service operation from the risk control models. For example, when the type of the service operation is transfer or payment, the service operation involves a transfer party or a service user initiating the payment, and a certain social relationship may exist between the user and the transfer party or the service user, and thus, the social relationship control model may be called from the risk control models.

In step 408, the service terminal searches the target risk control model by using the service information as a keyword to obtain a service creditability analysis value corresponding to the service information, where the service creditability analysis value corresponds to a second creditability analysis value. Continue with the example that the service operation is that the user transfers RMB 10,000 to the friend, where the service information correspondingly obtained in the step 406 may comprise the user name, the name, the mobile phone number, the email address and the like of the friend as the information of the service recipient, the type of the service operation may be a transfer transaction, and the target risk control model correspondingly called according to the service type "transfer" in the step 407 is the social relationship control model. The service terminal may search the social relationship control model by using the name and the mobile phone number of the friend as the keywords to obtain corresponding service creditability analysis values. Assume there is a close relationship between the friend and the user, when the social relationship control model is generated, the service creditability analysis value would be relatively high.

In step 409, the service terminal sends the second creditability analysis value to the service server.

In step 410, the service server obtains the first creditability analysis value of the service operation according to the local risk control model.

In this embodiment, the local risk control model is stored in the service server, and the local risk control model may be created according to network behavior data of the terminal user. In some implementations, when the security of the service operation is being verified, the service server may obtain the first creditability analysis value of the service operation according to the local risk control model.

In step 411, the service server obtains weight values of the first creditability analysis value and the second creditability analysis value.

For example, the service server may set the weight values for the first creditability analysis value and the second creditability analysis value, and store the weight values locally. It should be noted that the above weight values may be adjusted according to needs of practical application, which will not be limited in the present disclosure.

In step 412, the service server calculates a combined creditability analysis value based on the first creditability analysis value and the second creditability analysis value according to the weight values.

In this step, the service server may be configured to multiply the first creditability analysis value by its weight value, and multiply the second creditability analysis value by its weight value, and add the above two products to obtain the combined creditability analysis value.

In step 413, the service server compares the combined creditability analysis value with a preset creditability threshold. In some embodiments, the service server may set a creditability threshold in advance so as to determine the security of the service operation.

Continuing with the example that the service operation is that the user transfers RMB 10,000 to the friend, assuming that the creditability threshold set in the service server in advance is 60, weight values set for the first creditability analysis value and the second creditability analysis value are respectively 80% and 20%, the first creditability analysis value obtained by the service server itself is 50, the second creditability analysis value obtained from the service terminal by the service server is 90, and the combined creditability analysis value obtained by performing step 412 is 80%× 55+20%×90=62.

In step 414, the service server determines the security of the service operation according to a comparing result.

According to a comparing result in the step 413, if the comprehensive creditability analysis value is greater than the creditability threshold, the service server may determine that the service operation is secure. If the comprehensive creditability analysis value is not greater than the creditability threshold, the service server may determine that the service operation is insecure. For example, if the terminal user desires to transfer RMB 10,000 to the friend, because the transfer amount is larger, the service server may determine that this transfer service is not credible according to the first creditability analysis value 55 (less than the creditability threshold 60) obtained according to calculation, which would result in an inaccurate verification result. However, by combining with the second creditability analysis value obtained by the service terminal, the combined creditability analysis value obtained is 62, and it may be determined that the transfer service is secure. Thus, by combining with the second creditability analysis value obtained by the service terminal, the accuracy for verifying the security of the service operation may be improved.

Figure 5:
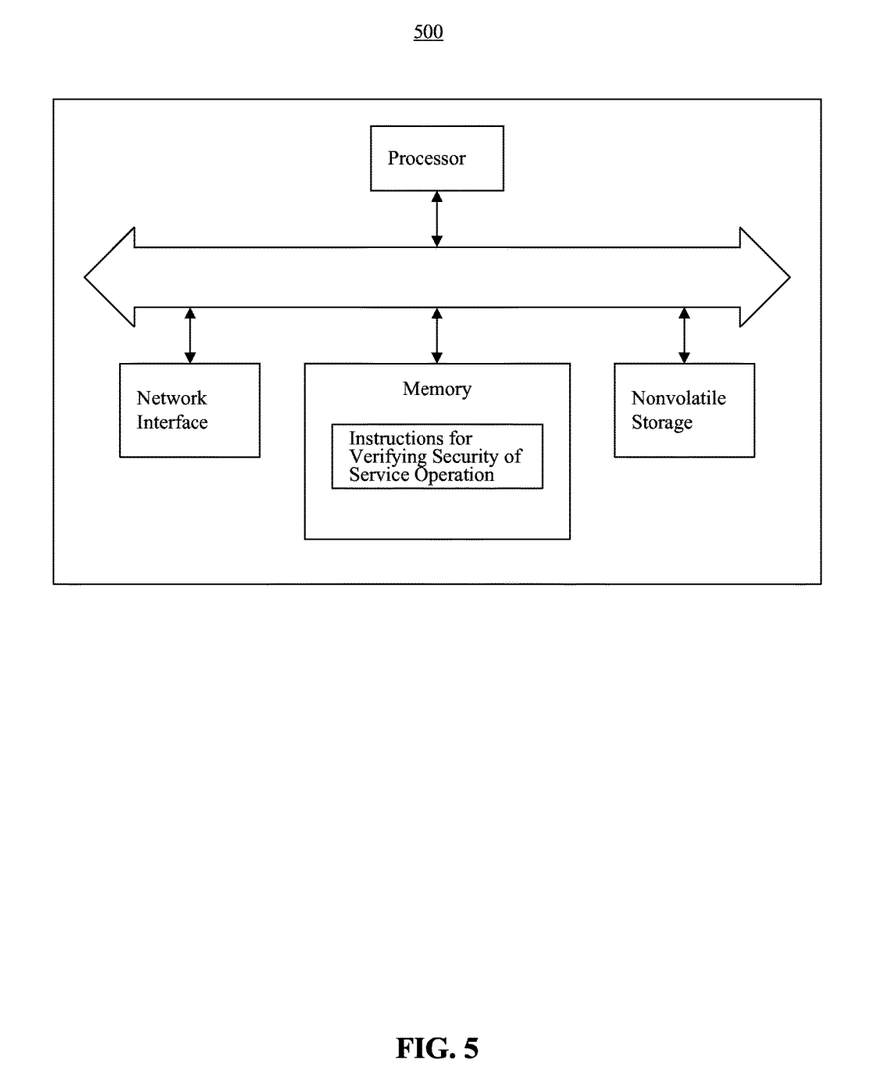
FIG. 5 is a block diagram of an exemplary service server for verifying the security of a service operation, consistent with some embodiments of this disclosure.

FIG. 5 is a block diagram of an exemplary service server 500 for verifying the security of a service operation, consistent with some embodiments of this disclosure. As shown in FIG. 5, the exemplary service server 500 includes a CPU, a memory, a network interface, and a nonvolatile storage. The CPU may be configured to perform various functions and data processing by operating programs and modules stored in the memory. For example, the CPU may be configured to execute instructions so as to perform all or a part of the steps in the above described methods. In exemplary embodiments, instructions may be red from the nonvolatile storage into the memory, such as Instructions for verifying the security of service operations, which are executable by the CPU in the service server 500 to perform the above-described methods. Similar structures may be implemented in a service terminal to perform methods for verifying the security of service operations described above. The service server and service terminal may also include other components not shown in FIG. 5.

Figure 6:
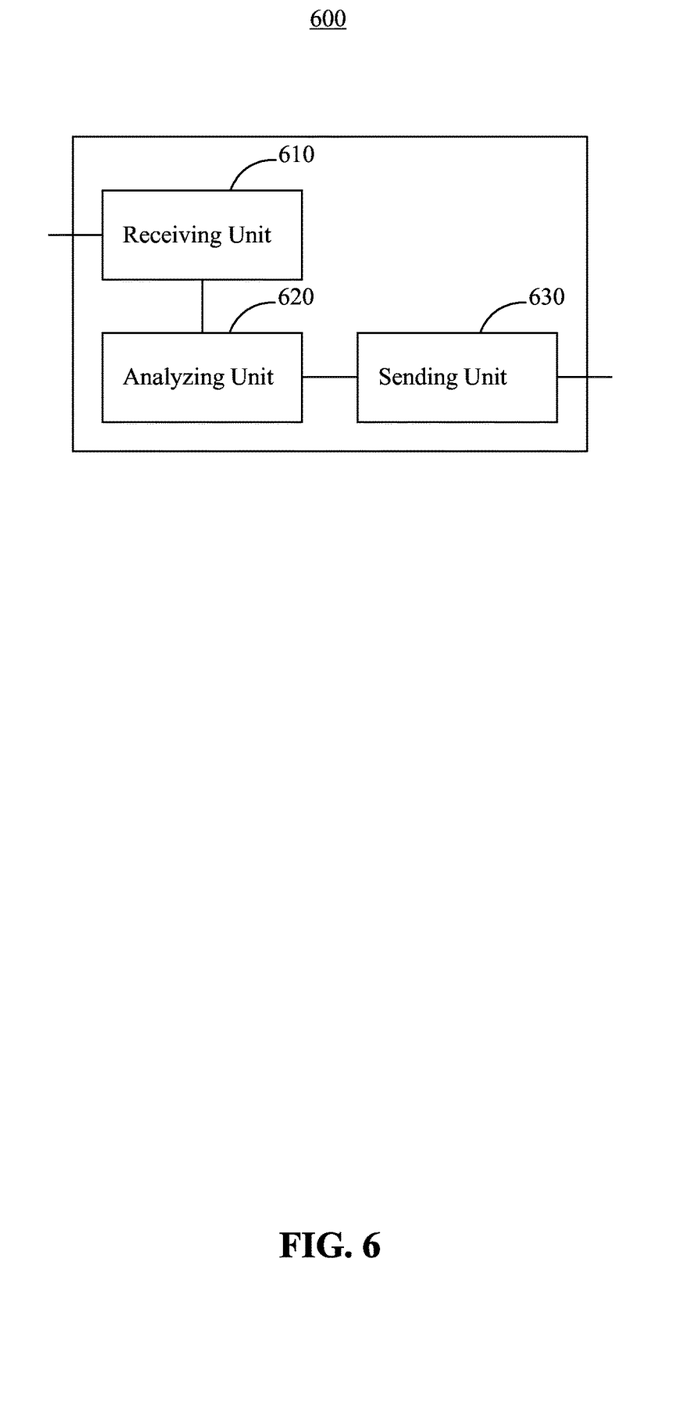
FIG. 6 is a block diagram of an exemplary device for verifying the security of a service operation, consistent with some embodiments of this disclosure.

FIG. 6 is a block diagram of an exemplary device 600 for verifying the security of a service operation, consistent with some embodiments of this disclosure. The exemplary device 600 may be implemented in a service terminal. Referring to FIG. 6, the device 600 comprises a receiving unit 610, an analyzing unit 620 and a sending unit 630.

The receiving unit 610 is configured to receive a creditability analysis instruction of a service operation, sent by a service server.

The analyzing unit 620 is configured to obtain a creditability analysis result of the service operation based on the creditability analysis instruction and one or more pre-stored risk control models.

The sending unit 630 is configured to send the creditability analysis result to the service server, such that the service server may determine the security of the service operation based on the creditability analysis result. In some implementations, the sending unit 630 may be further configured to send an operation request of the service operation to the service server when a user of the service terminal initiates the service operation.

Figure 7:
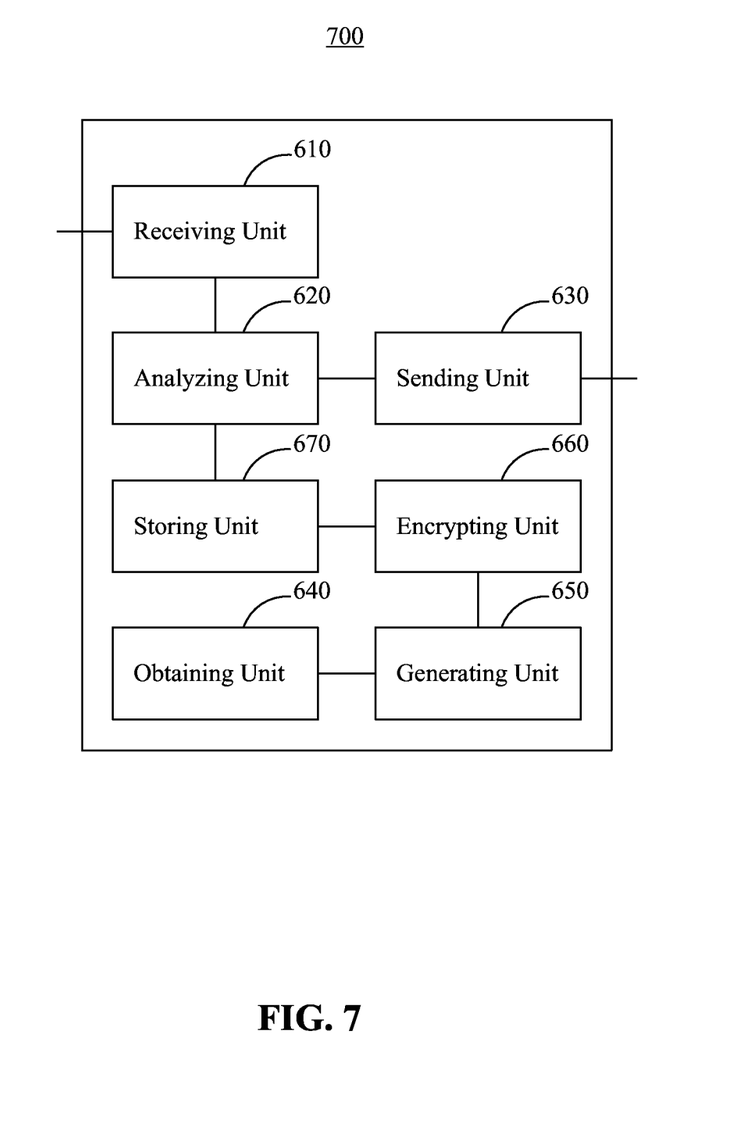
FIG. 7 is a block diagram of another exemplary device for verifying the security of a service operation, consistent with some embodiments of this disclosure.

FIG. 7 is a block diagram of another exemplary device 700 for verifying the security of a service operation, consistent with some embodiments of this disclosure. The exemplary device 700 may be implemented in a service terminal. Referring to FIG. 7, the device 700 further comprises an obtaining unit 640, a generating unit 650, an encrypting unit 660 and a storing unit 670, in addition to a receiving unit 610, an analyzing unit 620 and a sending unit 630.

The obtaining unit 640 is configured to obtain user data from a service terminal according to an authorization permission of a terminal user.

The generating unit 650 is configured to generate one or more risk control models by analyzing the user data.

The encrypting unit 660 is configured to encrypt the risk control models generated by the generating unit.

The storing unit 670 is configured to store the encrypted risk control models in a local security control database of the service terminal.

In some embodiments, the analyzing unit 620 may comprise a service information obtaining subunit, a target risk control model calling subunit, and a service creditability analysis value obtaining subunit.

The service information obtaining subunit is configured to obtain service information of the service operation according to the creditability analysis instruction. In some implementations, the service information obtaining subunit may be configured to obtain service information of the service operation from the creditability analysis instruction, where the service information of the service operation is obtained by the service server according to an operation request sent by another terminal, such as a third-party terminal. In some implementations, the service information obtaining subunit may be configured to obtain the service information of the service operation according to the operation request sent to the service server, when receiving the creditability analysis instruction.

The target risk control model calling subunit is configured to call a target risk control model from the pre-stored risk control models according to a type of the service operation, where the target risk control model indicates a corresponding relationship between service information and service creditability analysis values.

The service creditability analysis value obtaining subunit is configured to search the target risk control model by using the service information as a keyword to obtain a service creditability analysis value.

Figure 8:
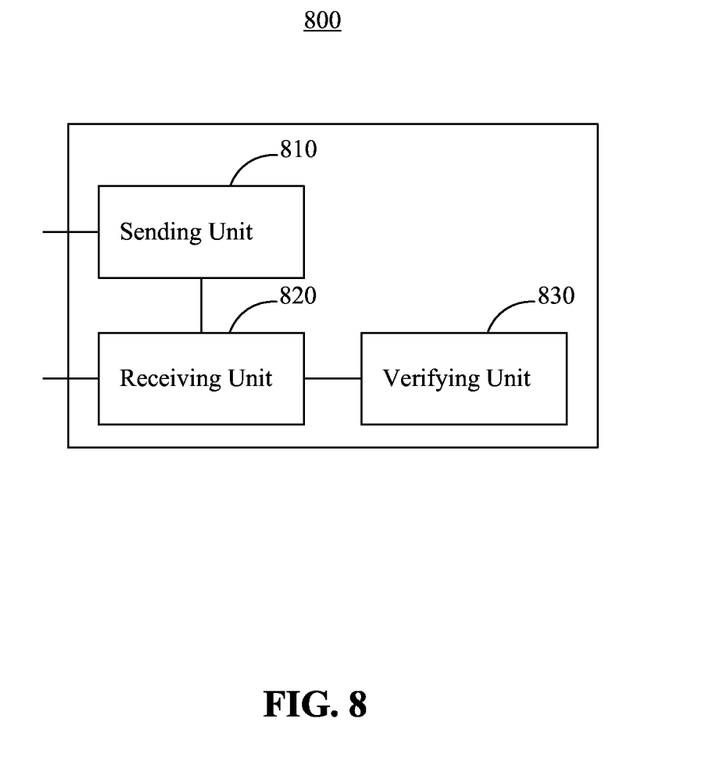
FIG. 8 is a block diagram of another exemplary device for verifying the security of a service operation, consistent with some embodiments of this disclosure.

FIG. 8 is a block diagram of another exemplary device 800 for verifying the security of a service operation, consistent with some embodiments of this disclosure. The exemplary device 800 may be implemented in a service server. Referring to FIG. 8, the device 800 comprises a sending unit 810, a receiving unit 820, and a verifying unit 830.

The sending unit 810 is configured to send a creditability analysis instruction of a service operation to a service terminal.

The receiving unit 820 is configured to receive a creditability analysis result sent by the service terminal, where the creditability analysis result is obtained by the service terminal based on the creditability analysis instruction of the service operation and one or more risk control models pre-stored in the service terminal.

The verifying unit 830 is configured to determine the security of the service operation according to the creditability analysis result.

In some implementations, the receiving unit 820 may be further configured to receive an operation request of the service operation sent by another terminal, such as a third-party terminal. In some embodiments, the device 800 may further comprise an obtaining unit (not shown in FIG. 8) configured to obtain service information of the service operation according to the operation request sent by the other terminal. The sending unit 810 may be configured to send an operation request including the service information of the service operation to the service terminal.

In some implementations, the receiving unit 820 may be further configured to receive an operation request of the service operation sent by the service terminal, when a user of the service terminal initiates the service operation. The sending unit 810 may be configured to, by using the operation request as a trigger instruction, send a creditability analysis instruction of the service operation to the service terminal.

In some embodiments, the verifying unit 830 may comprise a creditability analysis value obtaining subunit, a weight value obtaining subunit, a combined creditability analysis value calculating subunit, a creditability analysis value comparing subunit, and a service security determining subunit (not shown in FIG. 8).

The creditability analysis value obtaining subunit is configured to obtain a first creditability analysis value of the service operation according to a local risk control model.

The weight value obtaining subunit is configured to, by using a creditability analysis result sent by the service terminal as a second creditability analysis value, obtain weight values of the first creditability analysis value and the second creditability analysis value.

The combined creditability analysis value calculating subunit is configured to calculate a combined creditability analysis value of the first creditability analysis value and the second creditability analysis value according to the weight values.

The creditability analysis value comparing subunit is configured to compare the combined creditability analysis value with a preset creditability threshold.

The service security determining subunit is configured to, if the combined creditability analysis value is greater than the creditability threshold, determine that the service operation is secure, and if the combined creditability analysis value is not greater than the creditability threshold, determine that the service operation is insecure.

In exemplary embodiments, a non-transitory computer-readable storage medium including instructions is also provided, and the instructions may be executed by a device (such as a terminal, a server, a personal computer, or the like), for performing the above-described methods. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for verifying a security of a service operation, comprising:
   generating one or more risk control models based on user data associated with a user of a service terminal;
   receiving, by the service terminal, a creditability analysis instruction of the service operation, the creditability analysis instruction being sent by a service server in response to an operation request associated with the service terminal;
   performing, by the service terminal, a creditability analysis to obtain a creditability analysis result of the service operation based on the creditability analysis instruction and the one or more risk control models pre-stored in the service terminal; and
   sending, by the service terminal, the creditability analysis result to the service server for determining the security of the service operation.

2. The method according to claim 1, further comprising:
   obtaining the user data from the service terminal based on an authorization permission of a user of the service terminal;
   generating the one or more risk control models by analyzing the user data; and
   storing the one or more risk control models in a database of the service terminal.

3. The method according to claim 2, further comprising:
   encrypting the one or more risk control models before storing the one or more risk control models in a local security control database of the service terminal; and
   storing the encrypted one or more risk control models in the database of the service terminal.

4. The method according to claim 2, wherein the user data comprises at least one of: user social data, interest data and habit data, and wherein the one or more risk control models comprise at least one of: a social relationship control model generated based on the user social data, an interest control model generated based on the interest data, and a habit control model generated based on the habit data.

5. The method according to claim 1, wherein obtaining a creditability analysis result of the service operation comprises:
   obtaining service information of the service operation based on the creditability analysis instruction;
   obtaining a target risk control model from the one or more risk control models based on a type of the service operation, wherein the one or more risk control models include a corresponding relationship between service information and service creditability analysis values; and
   searching the target risk control model by using the service information as a keyword to obtain a service creditability analysis value corresponding to the service information.

6. The method according to claim 5, wherein obtaining service information of the service operation based on the creditability analysis instruction comprises:
   obtaining the service information from the creditability analysis instruction of the service operation, wherein the service information includes information obtained by the service server based on an operation request of the service operation sent by another terminal.

7. The method according to claim 5, further comprising:
   when a user of the service terminal initiates the service operation, sending an operation request of the service operation to the service server before receiving the creditability analysis instruction; and
   when receiving the creditability analysis instruction, obtaining the service information of the service operation based on the operation request of the service operation.

8. A method for verifying a security of a service operation, comprising:
   sending a creditability analysis instruction of the service operation to a service terminal in response to an operation request associated with the service terminal;
   receiving a creditability analysis result sent by the service terminal, wherein the creditability analysis result is obtained by the service terminal based on the service terminal performing a creditability analysis of the service operation and one or more risk control models pre-stored in the service terminal; and
   determining the security of the service operation based on the creditability analysis result.

9. The method according to claim 8, further comprising:
   before sending the creditability analysis instruction of the service operation to the service terminal, receiving the operation request of the service operation sent by another terminal; and
   obtaining service information of the service operation based on the operation request, wherein the creditability analysis instruction of the service operation includes the service information of the service operation.

10. The method according to claim 8, further comprising:
    before sending the creditability analysis instruction of the service operation to the service terminal, receiving the operation request of the service operation sent by the service terminal, wherein the operation request is used as a trigger instruction for sending the creditability analysis instruction of the service operation to the service terminal.

11. The method according to claim 8, wherein determining the security of the service operation based on the creditability analysis result comprises:
    obtaining a first creditability analysis value of the service operation based on a local risk control model;
    obtaining a second creditability analysis value based on the creditability analysis result sent by the service terminal;
    obtaining weight values of the first creditability analysis value and the second creditability analysis value;
    calculating a combined creditability analysis value of the first creditability analysis value and the second creditability analysis value based on the weight values;
    comparing the combined creditability analysis value with a preset creditability threshold; and
    if the combined creditability analysis value is greater than the creditability threshold, determining that the service operation is secure, and if the combined creditability analysis value is not greater than the creditability threshold, determining that the service operation is insecure.

12. A device for verifying a security of a service operation, comprising:
    a generating unit configured to generate one or more risk control models based on user data associated with a user of a service terminal;

a receiving unit configured to receive a creditability analysis instruction of the service operation sent by a service server;

an analyzing unit configured to obtain a creditability analysis result of the service operation based on the service terminal performing a creditability analysis and the one or more risk control models pre-stored in the service terminal; and a sending unit configured to send the creditability analysis result to the service server for determining the security of the service operation.

13. A device for verifying a security of a service operation, comprising:

a sending unit configured to send a creditability analysis instruction of the service operation to a service terminal in response to an operation request associated with the service terminal;

a receiving unit configured to receive a creditability analysis result sent by the service terminal, wherein the creditability analysis result is obtained by the service terminal based on the service terminal performing a creditability analysis of the service operation and one or more risk control models pre-stored in the service terminal; and a verifying unit configured to determine the security of the service operation based on the creditability analysis result.

14. A terminal, comprising:

a memory configured to store a set of instructions;

a processor configured to execute the set of instructions to cause the terminal to:

generate one or more risk control models based on user data associated with a user of the terminal;

receive a creditability analysis instruction of a service operation sent by a service server in response to an operation request associated with the terminal;

obtain a creditability analysis result of the service operation based on the service terminal performing a creditability analysis and the one or more risk control models pre-stored in the terminal; and send the creditability analysis result to the service server for determining a security of the service operation.

15. A service server, comprising:

a memory configured to store a set of instructions;

a processor configured to execute the set of instructions to cause the service server to:

send a creditability analysis instruction of a service operation to a service terminal in response to an operation request associated with the service terminal;

receive a creditability analysis result sent by the service terminal, wherein the creditability analysis result is obtained by the service terminal based on the service terminal performing a creditability analysis of the service operation and one or more risk control models pre-stored in the service terminal; and determine a security of the service operation based on the creditability analysis result.

16. A non-transitory computer readable medium that stores a set of instructions that is executable by at least one processor of a service terminal to cause the service terminal to perform a method for verifying a security of a service operation, the method comprising:

generating one or more risk control models based on user data associated with a user of a service terminal;

receiving a creditability analysis instruction of the service operation, the creditability analysis instruction being sent by a service server in response to an operation request associated with the service terminal;

obtaining a creditability analysis result of the service operation based on the service terminal performing a creditability analysis and the one or more risk control models pre-stored in the service terminal; and sending the creditability analysis result to the service server for determining the security of the service operation.

17. The computer readable medium according to claim 16, wherein the set of instructions that is executable by the at least one processor of the service terminal to cause the service terminal to further perform:

obtaining the user data from the service terminal based on an authorization permission of the user of the service terminal;

generating the one or more risk control models by analyzing the user data; and storing the one or more risk control models in a database of the service terminal.

18. The computer readable medium according to claim 17, wherein the set of instructions that is executable by the at least one processor of the service terminal to cause the service terminal to further perform:

encrypting the one or more risk control models before storing the one or more risk control models in a local security control database of the service terminal; and storing the encrypted one or more risk control models in the database of the service terminal.

19. The computer readable medium according to claim 17, wherein the user data comprises at least one of: user social data, interest data and habit data, and wherein the one or more risk control models comprise at least one of: a social relationship control model generated based on the user social data, an interest control model generated based on the interest data, and a habit control model generated based on the habit data.

20. The computer readable medium according to claim 16, wherein obtaining a creditability analysis result of the service operation comprises:

obtaining service information of the service operation based on the creditability analysis instruction;

obtaining a target risk control model from the one or more risk control models based on a type of the service operation, wherein the one or more risk control model includes a corresponding relationship between the service information and service creditability analysis values; and searching the target risk control model by using the service information as a keyword to obtain a service creditability analysis value corresponding to the service information.

21. The computer readable medium according to claim 20, wherein obtaining service information of the service operation based on the creditability analysis instruction comprises:

obtaining the service information from the creditability analysis instruction of the service operation, wherein the service information includes information obtained by the service server based on the operation request of the service operation sent by another terminal.

22. The computer readable medium according to claim 20, wherein the set of instructions that is executable by the at least one processor of the service terminal to cause the service terminal to further perform:

when the user of the service terminal initiates the service operation, sending the operation request of the service operation to the service server before receiving the creditability analysis instruction; and when receiving the creditability analysis instruction, obtaining the service information of the service operation based on the operation request of the service operation.

23. A non-transitory computer readable medium that stores a set of instructions that is executable by at least one processor of a service server to cause the service server to perform a method for verifying a security of a service operation, the method comprising:

sending a creditability analysis instruction of the service operation to a service terminal in response to an operation request associated with the service terminal;

receiving a creditability analysis result sent by the service terminal, wherein the creditability analysis result is obtained by the service terminal based on the service terminal performing a creditability analysis of the service operation and one or more risk control models pre-stored in the service terminal; and determining the security of the service operation based on the creditability analysis result.

24. The computer readable medium according to claim 23, wherein the set of instructions that is executable by the at least one processor of the service server to cause the service server to further perform:

before sending the creditability analysis instruction to analyze the creditability of the service operation to the service terminal, receiving the operation request of the service operation sent by another terminal; and obtaining service information of the service operation based on the operation request, wherein the creditability analysis instruction of the service operation includes the service information of the service operation.

25. The computer readable medium according to claim 23, wherein the set of instructions that is executable by the at least one processor of the service server to cause the service server to further perform:

before sending the creditability analysis instruction of the service operation to the service terminal, receiving the operation request of the service operation sent by the service terminal, wherein the operation request is used as a trigger instruction for sending the creditability analysis instruction of the service operation to the service terminal.

26. The computer readable medium according to claim 23, wherein determining the security of the service operation based on the creditability analysis result comprises:

obtaining a first creditability analysis value of the service operation based on a local risk control model;

obtaining a second creditability analysis value based on the creditability analysis result sent by the service terminal;

obtaining weight values of the first creditability analysis value and the second creditability analysis value;

calculating a combined creditability analysis value of the first creditability analysis value and the second creditability analysis value based on the weight values;

comparing the combined creditability analysis value with a preset creditability threshold; and if the combined creditability analysis value is greater than the creditability threshold, determining that the service operation is secure, and if the combined creditability analysis value is not greater than the creditability threshold, determining that the service operation is insecure.

* * * * *

UNITED STATES PATENT AND TRADEMARK OFFICE
CERTIFICATE OF CORRECTION

PATENT NO. : 10,313,353 B2  
APPLICATION NO. : 14/880637  
DATED : June 4, 2019  
INVENTOR(S) : Kun Lu

Page 1 of 1

It is certified that error appears in the above-identified patent and that said Letters Patent is hereby corrected as shown below:

On the Title Page

Item (30), "2014 1 0539483" should read as --201410539483.2--

Signed and Sealed this  
Seventeenth Day of September, 2019

Andrei Iancu  
*Director of the United States Patent and Trademark Office*